April 8, 1958  L. GILBERT  2,829,484
CUCUMBER HARVESTER

Filed Oct. 1, 1954  4 Sheets-Sheet 1

INVENTOR.
Lloyd F. Gilbert
BY
Glenn B. Morse
Attorney

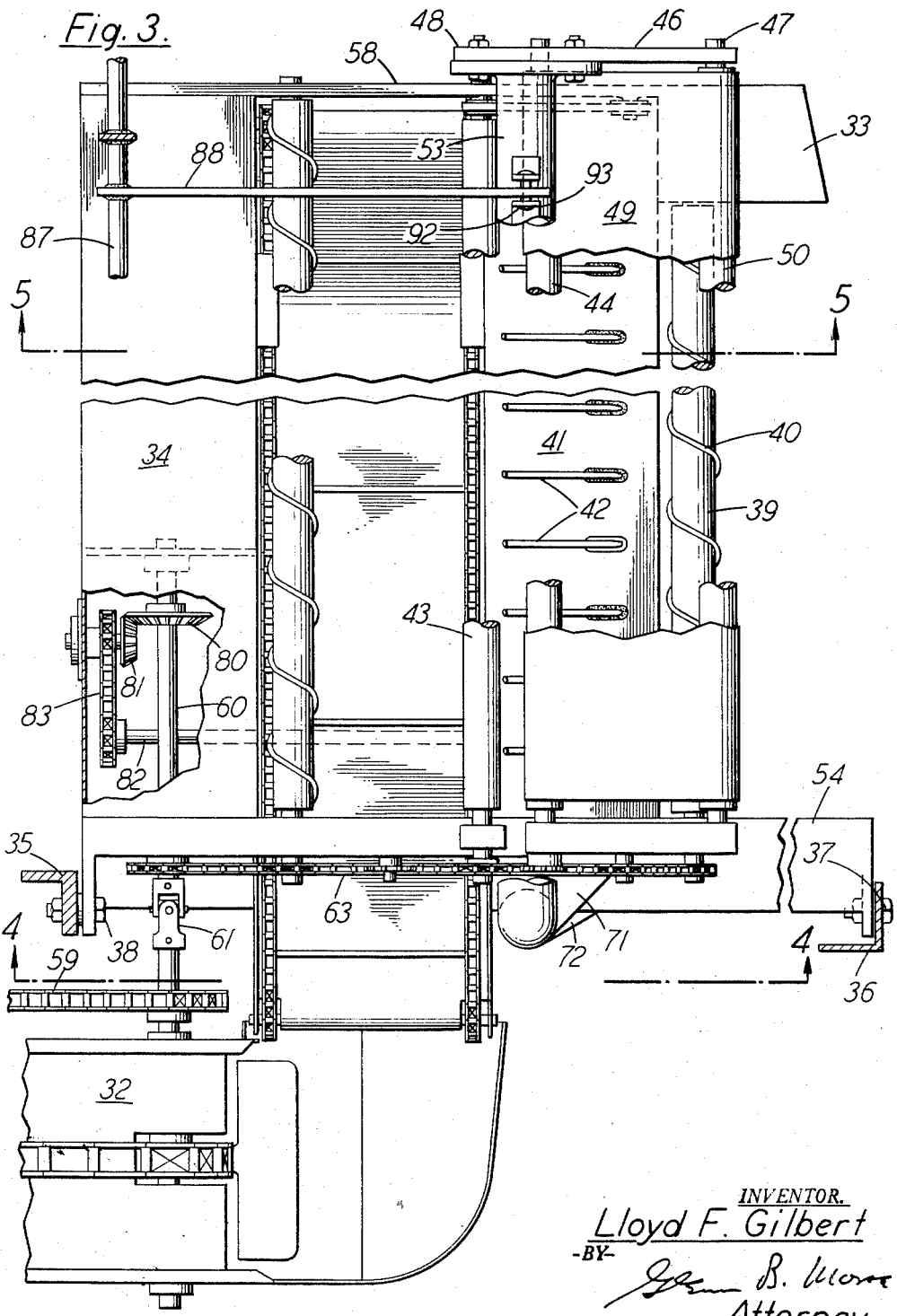

April 8, 1958     L. GILBERT     2,829,484
CUCUMBER HARVESTER
Filed Oct. 1, 1954     4 Sheets-Sheet 3
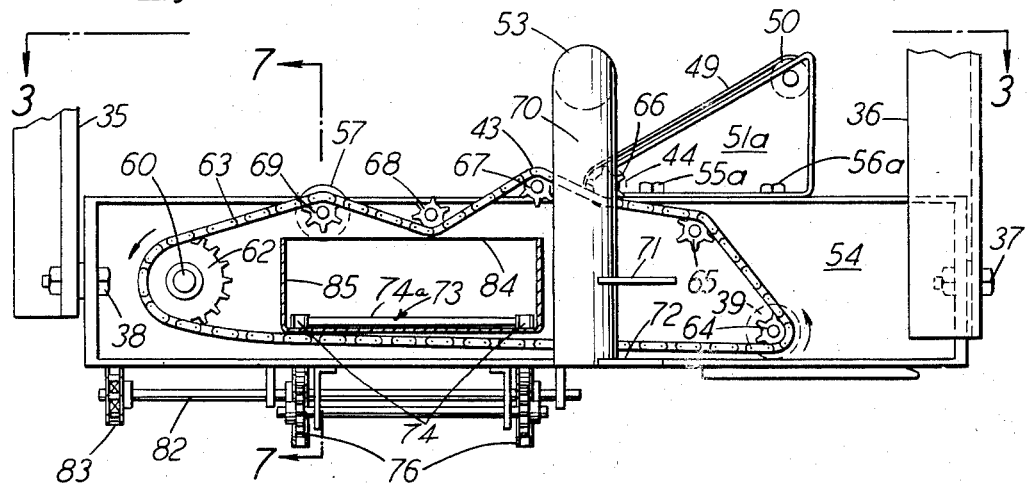
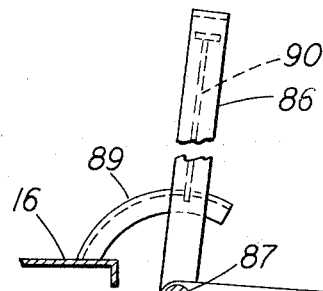
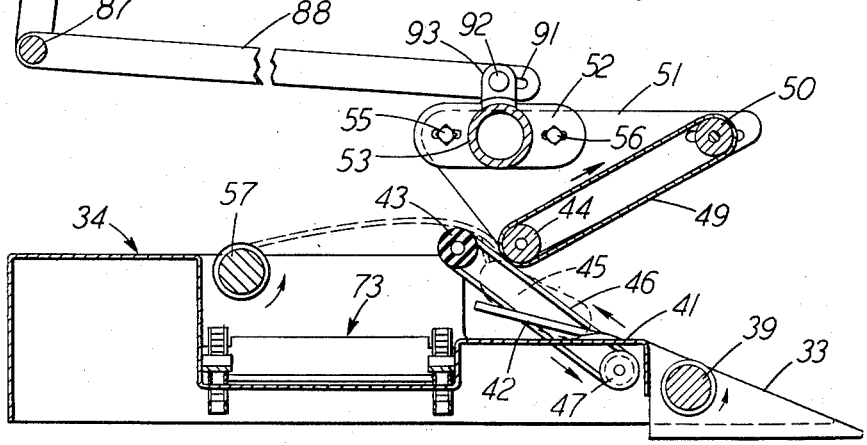
Inventor
Lloyd F. Gilbert
By
Attorney April 8, 1958  L. GILBERT  2,829,484
CUCUMBER HARVESTER Filed Oct. 1, 1954  4 Sheets-Sheet 4

Inventor
Lloyd F. Gilbert
By
Attorney

United States Patent Office 2,829,484
Patented Apr. 8, 1958

2,829,484

CUCUMBER HARVESTER

Lloyd Gilbert, Ravenna, Mich.

Application October 1, 1954, Serial No. 459,598

7 Claims. (Cl. 56—327)

This invention provides a machine for harvesting cucumbers. In the preferred form of the invention, the basic harvesting mechanism is incorporated in a self-propelled vehicle capable of being steered along a desired path through a field of cucumber vines, resulting in the removal of all of the cucumbers in excess of a particular size from the vines that have been traversed by the vehicle. During the cultivation of the vines, they are maintained in a position corresponding to an angle of approximately forty-five degrees to the planting row. The vines alternate in proceeding to the right and left, and the harvesting mechanism described herein is intended to be operated along the row from a direction such that the root-ends of the vines are encountered first. In other words, the vines diverge in the direction of movement of the harvester.

As a particular vine is encountered by the harvesting mechanism, a ground-engaging shoe elevates the vine at a point fairly close to where it joins the root, and continued forward movement of the vehicle accompanied by the action of a feeding roller gradually works the vine into an area where a comb-like series of laterally-spaced abutments continues the elevation of the vine itself while permitting cucumbers to depend therefrom in an attitude approaching the vertical. This movement of the vine is facilitated by the presence of a helical ridge on the first feed roller encountered. The "hand" of the helical ridge is such that the rotation of the roller causes the ridge to urge the outer portions of the vine laterally outward from the root. This action has been found desirable in order to maintain the desired alignment of the vines with respect to the planting row. The movement of the harvesting mechanism is such that a vine is given a slight pull in the opposite direction to the movement of the vehicle, which would tend to modify the angular relationship of the vine with respect to the ground as the harvesting process progresses. This effect is counteracted by the action of the helical ridge which tends to urge the vine outwardly, so that it maintains its original attitude. It will be appreciated that a vine disposed at a particular angle to the planting row will be distorted in its position if a pull in the direction parallel to the planting row is imparted at a point somewhere along the vine. The portion of the vine from that point outward will tend to drag progressively into a position parallel to the planting row, and the action of the helical roller tends to restore the desired position.

After the vines have moved across the comb-like series of abutments, they are caused to enter between a pair of spaced rollers, the distance between which is selected to pass a cucumber of a given size. Those in excess of this size are pinched off, and do not pass through the rollers. A moving belt is incorporated with one of these rollers so that foliage of the vines is given an even guiding action, and is induced to pass between the rollers without damage. The vine passes between the moving belt and comb-like abutments as it approaches the spaced rollers for the picking operation. After emerging from between these two rollers, the vine moves on through the machine, and is preferably helped along its way by another roller provided with a helical ridge. The action of this roller supplements the action of the ridged roller which is first encountered by the vine. As the heavier portion of the vine near the root passes through the picking rollers, it is assisted by a fairly heavy belt (preferably a "V-belt") which either bears against or operates in close proximity to the guiding belt described above. The heavier portions of the vine are extremely tough and durable, and the engagement of these two belts with this portion of the vine gives a strong impulse to the movement of the entire vine through the machine.

As the cucumbers are removed from the vine by the picking rollers, they fall downwardly through the comb-like abutments in an area from which they preferably tumble onto a lateral conveyor which carries them up to a position along side the vehicle where they are discharged into a lifting conveyor, and are thereby transported to an accumulating bin mounted on the vehicle. Preferably, the structure just described is duplicated on the opposite sides of the vehicle, with space being provided between the ground-engaging shoes of the opposite harvesting mechanisms to accommodate the portions of the vine where they enter the ground and join the root structure. The alternate right-left disposition of the vines along the row result in harvesting substantially half the row with each of the duplicate harvesting mechanisms, with the total output dumped into the accumulator bin as the vehicle moves along its route.

There are several features of this invention which will be analyzed in detail through a discussion of the particular embodiment illustrated in the accompanying drawings. In the drawings:

Figure 1 presents a side elevation of a complete cucumber-harvesting vehicle.

Figure 3 is a fragmentary plan view on an enlarged scale with parts broken away and shown in section illustrating one of the opposite harvesting units on the vehicle illustrated in Figure 1.

Figure 4 is a section taken on the plane 4—4 of Figure 3.

Figure 5 is a section taken on the plane 5—5 of Figure 3.

Figure 6 presents approximately a half of the front of the vehicle.

Figure 1:
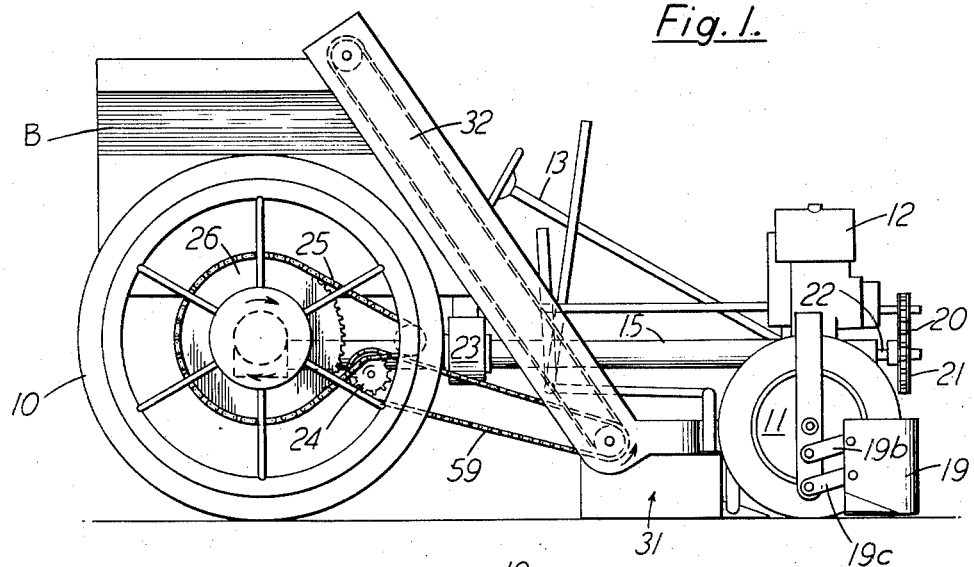
Figure 6:
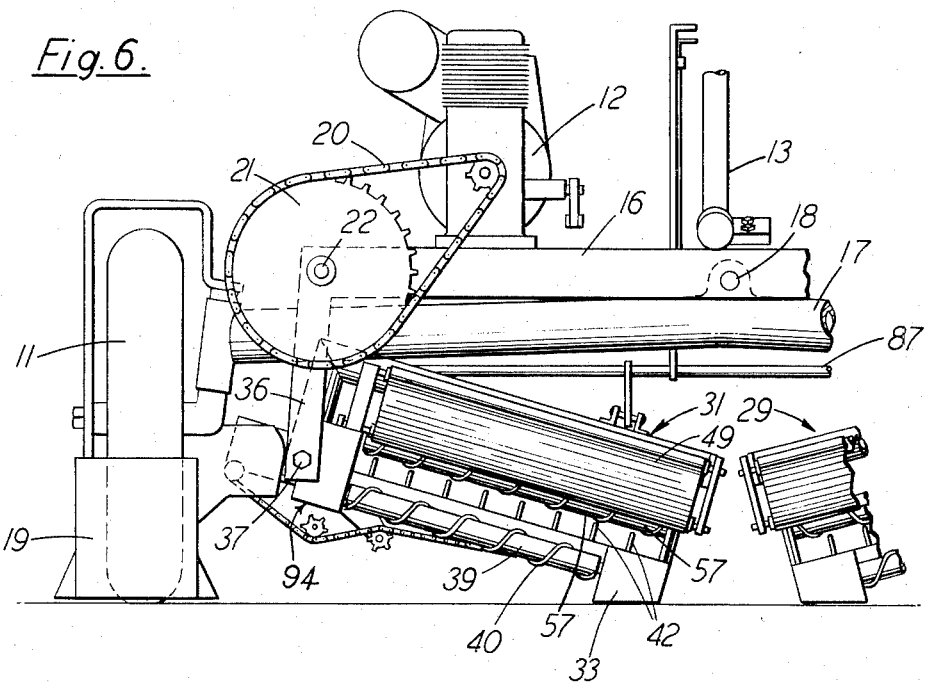
Figure 6 is an enlarged front elevational view of a portion of the harvester shown in Figure 1.

Referring to Figure 1, the harvesting vehicle includes the rear driving wheels 10, the steerable front wheels 11, 11a, the motor 12, and the steering control assembly 13. The tubular members 14 and 15 form the side structural members of the frame of the vehicle, referred to in the claims appended hereto as "first frame means," and are connected at the front at a transverse beam 16 on which the motor 12 is mounted. An auxiliary beam 17 (see Figure 6) is pivotally connected to the transverse beam 16 at the center of the vehicle by the bolt 18, the wheels 11 and 11a being positioned at the opposite ends of the auxiliary beam 17. Movement of the vehicle over uneven ground will result in angular movement of the auxiliary beam 17 with respect to the beam 16, and the framework of the vehicle is thus freed from a substantial amount of torsional stress. The wheels 11 and 11a are provided with shielding fenders 19 and 19a which have the principal function of deflecting the vines from the path of movement of the wheels to avoid damage. The fender units 19 and 19a are preferably mounted as shown in Figure 1 on the vehicle through the use of parallel links as indicated at 19b and 19c. These links are pivotally connected to the vehicle and to the fender so that the fender is permitted to be supported at all times by the ground, thus tending to prevent the passage of vines underneath wheels of the vehicle.

Figure 2:
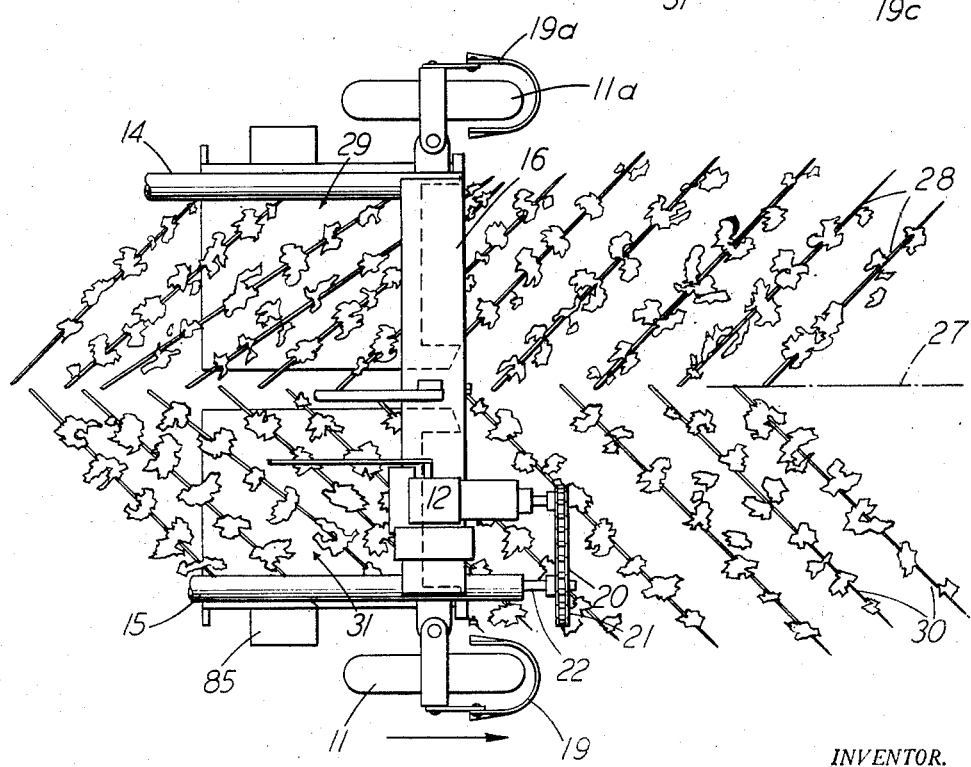
Figure 2 is a plan view of a forward portion of a vehicle, showing its relationship with the vines as they are arranged along the ground.

Power is supplied to the vehicle from the motor 12 through the chain 20, which drives the sprocket 21 mounted on a shaft 22 concentric with and disposed within the tubular side member 15 forming the frame of the vehicle. The shaft 22 extends to the rear to the geared transmission unit 23, which includes a differential, and drives sprockets 24 disposed on opposite sides of the vehicle. These sprockets, in turn, transfer power through the chains 25 to the sprockets 26 which are fixed with respect to the rear driving wheels 10. Movement of the vehicle along the planting row indicated in Figure 2 at 27 results in harvesting the cucumbers on the left side indicated at 28 with the harvesting unit generally indicated at 29, and the removal of the cucumbers from the vines on the opposite side of the row indicated at 30 by the harvesting unit 31. Cucumbers harvested by the unit 31 are transferred to the elevator conveyor 32, and are carried thereby to the accumulating bin B. The elevator-conveyor units are not shown in Figure 2, but similar structure to that indicated in Figure 1 is disposed on opposite sides of the vehicle.

The details of the harvesting units 29 and 31 are shown in Figures 3 through 7. As the vines 30 are encountered by the harvesting unit 31, they are first contacted by the ground-engaging shoe 33 which moves underneath the vines adjacent to the point where they enter the ground, and elevates them into the area where they are controlled by the action of the harvester. The shoe 33 is mounted on the lower portion 34 of an auxiliary frame, referred to in the claims appended hereto as "second frame means," which is constructed principally of formed sheet material and which is pivotally mounted between the downward extensions 35 and 36 of the main frame of the vehicle on the bolts 37 and 38, respectively. An unevenness in the ground traversed by the shoe 33 will result in some degree of articulation of the auxiliary frame 94 about the axis of the bolts 37 and 38.

The first moving element encountered by the vines as they engage the harvester is the roller 39 referred to in the claims appended hereto as a "first roller," which is provided with the helical ridge 40. The drive mechanism for the roller results in inducing a movement of the upper portion of the roller toward the rear of the vehicle, and the "hand" of the helical ridge is such as to urge the vines 30 outwardly toward the side of the vehicle as the operation progresses. As the vines pass over and beyond the roller 39, they encounter the platform 41 of the auxiliary frame 94, and also the series of comb-like laterally-spaced abutments 42 mounted substantially parallel to the center plane of the vehicle, and which support the vines as they move to the rear in the direction of the picking rollers 43 and 44 (see Figure 5). Roller 43 is referred to in the claims appended hereto as a "second roller." Cucumbers moving into the position indicated in dotted lines at 45 in Figure 5 will be pinched off the vines, and fall down onto the platform 41 between the abutments 42. Movement of the vines between the picking rollers 43 and 44 is facilitated by the presence of the V belt 46, which moves between the pulley 47, referred to in the claims appended hereto as a "first pulley," and a similar pulley 48, referred to in the claims as a "second pulley," which is co-axially disposed with the roller 43 (see Figure 3). The belt 46 preferably bears against vines positioned by the roller 44 and exerts a strong positive action against the heavy portion of the vine to start the vine through the picking rollers. The movement of the vine between the rollers is also facilitated by the presence of the belt 49 which engages the picking roller 44, and is also positioned by the roller 50 mounted at a point above and in front of the roller 44 (see Figure 5). The movement of the belt 49 tends to gently compress the foliage of the vines to the point where they can pass through and between the picking rollers without damage. Both the rollers 44 and 50, referred to in the claims appended thereto as "fourth" and "fifth" rollers, respectively, are mounted on the opposite plates 51 and 51a. Plate 51 is bolted to the flange member 52 secured to an upper portion 53 of the auxiliary frame 94. This upper portion 53 is preferably in the form of a cantilever tube secured to the same base member or beam 54 as is the lower portion 34. Bolts 55 and 56 engage slots in the flange member 52, and permit fore-and-aft adjustment of the plate 51 to bring the roller 44 in the desired relationship with the picking roller 43. Similarly, bolts 55a and 56a permit adjustment of the position of the plate 51a. The picking roller 43 is preferably covered with resilient material such as rubber, and the adjustment of the gap between the rollers 43 and 44 determines the size of the cucumbers which are permitted to pass through the devices for later harvesting.

The rollers 39, 43, and the helical roller 57, referred to in the claims appended hereto as a "third roller" (formed similarly to the roller 39) are all mounted between the end member 58 and the base beam 54 of the lower portion 34. The driving of these rollers is best indicated by the showing of Figure 4. A chain 59 transfers power from the output of the transmission to the shaft 60 through the universal 61 (necessary to compensate for the articulation of the harvesting units). The chain 59 also provides the power for driving the elevator-conveyors 32, as best shown in Figure 3. The sprocket 62 is driven, in turn, by the shaft 60, and induces movement of the chain 63. The chain 63 passes in turn over the sprockets 64 (associated with the helically-ridged roller 39), the idler sprocket 65, the sprocket 66 (associated with the roller 44), the sprocket 67 (associated with the roller 43), the idler sprocket 68, and the sprocket 69 (associated with the roller 57). The downwardly-extending part 70 of the upper portion 53 of the auxiliary frame is held in a position spaced outwardly from base beam 54 by the gussets 71 and 72 so that the chain 63 may pass between it and the base beam 54.

Figure 7:
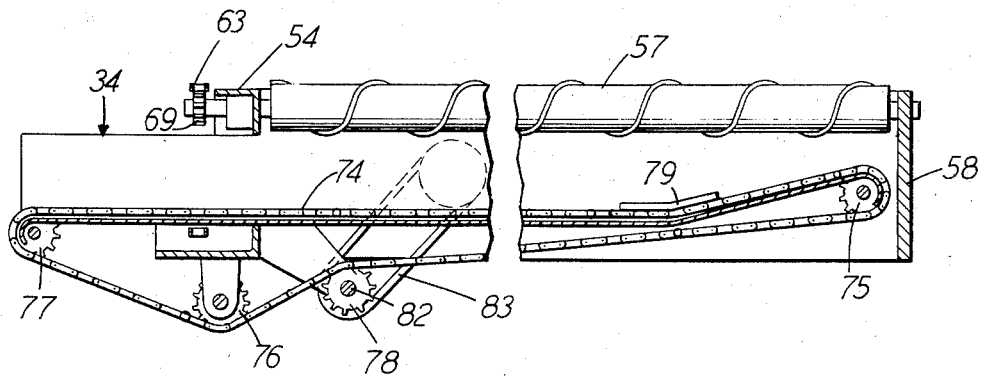
Figure 7 is a fragmentary section taken on the plane 7—7 of Figure 4.

After the cucumbers have been pinched off the stems of the vines, and have fallen down on the platform area 41, continued movement of the vines through the machine generates a sweeping action which urges them into the trough area of the transverse conveyor 73. The construction of this conveyor is best shown in Figure 7, and includes a series of transverse rods 74a carried by the chains 74 positioned by the idler sprockets 75, 76, and 77, and the drive sprockets 78. These drive sprockets receive torque through the system shown in Figure 3 and involve the bevel gear 80 driven by the shaft 60, which transfers power through the mating bevel gear associated therewith. The entire structure supporting this conveyor is fixed with respect to the lower portion 34 of the auxiliary frame 94. Cucumbers which are deposited on the conveyor 73 as a result of the picking operation are transferred laterally outward and dropped into the elevator-conveyor 32, in which they are transferred to the bin "B." The conveyor 73 carries the cucumbers through the opening 84 in the base beam 54, and through a trough 85 through which the cucumbers are discharged into the elevator-conveyor 32.

The structure outlined with regard to the harvesting unit 31 is duplicated to form the opposite harvesting unit 29, except for a change of "hand." Both of these units may be elevated out of active position through the operation of levers as indicated at 86 in Figure 5, which induces rotation of the shaft 87 and the arm 88. A sector 89 fixed with respect to the transverse beam 16 is engaged by a suitable detent 90 to maintain the selected position of the lever 86. A slot 91 is engaged by the pin 92 secured to the lug 93 connected to the upper portion 53 of the auxiliary frame, the slot being desirable in order to allow for the movement of the pin 92 with respect to the arm 88 during the angular movement of the arm.

The particular embodiments of the present invention which have been illustrated and discussed herein are for illustrative purposes only, and are not to be considered as a limitation upon the scope of the appended claims. In these claims, it is my intent to claim the entire invention disclosed herein, except as I am limited by the prior art.

I claim:

1. A cucumber-harvester, comprising: first frame means; supporting wheels rotatably mounted on said first frame means, said supporting wheels bearing against the ground and establishing a path of movement of said harvester; separate second frame means mounted at each of the opposite sides of said first frame means and extending inwardly from said sides, with the inner ends of said second frame means being laterally spaced apart, said second frame means being mounted for limited rotation on an axis substantially parallel to said path of movement, said second frame means each including an upper portion and a lower portion spaced therefrom in superimposed relationship; a ground-engaging shoe mounted on each of said lower portions spaced from each other; a first roller rotatably mounted on each of said lower portions and extending outwardly and upwardly from said shoes, respectively, said rollers having a helical ridge thereon; a first pulley mounted on each of said lower portions for rotation on axes respectively substantially parallel to the axes of rotation of said rollers, and adjacent said shoes and behind said first rollers with respect to said path of movement; a second pulley rotatably mounted on each of said lower portions above and behind said first pulleys, respectively; belt means connecting said first pulleys to said second pulleys; a second roller rotatably mounted opposite said first roller on each of said lower portions respectively for rotation coaxially with said second pulley, said second rollers having a cover of resilient material; a plurality of laterally spaced guiding abutments mounted on each of said lower portions respectively, and extending upwardly and rearwardly between said first and second rollers; a third roller mounted on each of said lower portions respectively for rotation on an axis parallel to the axes of said first rollers and behind said second rollers, said third rollers having helical ridges thereon; fourth and fifth rollers, said fourth and fifth rollers being mounted on and between a set of two opposite plates, one of said plates at each end of the said fourth and fifth rollers, one of said sets of plates being adjustably secured to each of said upper portions, respectively, for limited forward-rearward adjustment, said fourth and fifth rollers being mounted for rotation on axes parallel to the axes of said first rollers, said fourth rollers being disposed adjacent said second rollers, and said fifth rollers being mounted above and in front of said fourth rollers; belt means connecting said fourth rollers to said fifth rollers; transverse conveyor means mounted on said lower portions respectively, and disposed behind and below said second rollers, and adapted to carry objects outwardly; drive means operatively associated with said first, second, and third rollers and with said pulleys adapted to move the upper portions thereof to the rear, said helical ridges being helically inclined to induce outward movement of objects bearing against the same; dirve means operatively associated with said fourth and fifth rollers adapted to move the lower portions thereof to the rear; elevator-conveyor means operatively associated with and communicating with each of said transverse conveyors; and an accumulator bin mounted on said first frame means and disposed to receive the discharge from said elevator-conveyors.

2. A cucumber-harvester, comprising: first frame means; supporting means mounted on said first frame means, said supporting means bearing against the ground and establishing a path of movement of said harvester; separate second frame means mounted at each of the opposite sides of said first frame means and extending inwardly from said sides, with the inner ends of said second frame means being laterally spaced apart, said second frame means being mounted for limited rotation on an axis substantially parallel to said path of movement, said second and third frame means each including an upper portion and a lower portion spaced therefrom in superimposed relationship; a ground-engaging shoe mounted on each of said lower portions spaced from each other; a first roller rotatably mounted on each of said lower portions and extending outwardly and upwardly from said shoes, respectively, said rollers having a helical ridge thereon; a first pulley mounted on each of said lower portions for rotation on axes respectively substantially parallel to the axes of rotation of said rollers, and adjacent said shoes and behind said first rollers with respect to said path of movement; a second pulley rotatably mounted on each of said lower portions above and behind said first pulleys, respectively; belt means connecting said first pulleys to said second pulleys; a second roller rotatably mounted opposite said first roller on each of said lower portions respectively for rotation on axes parallel to the axes of rotation of said first rollers, a plurality of laterally spaced guiding abutments mounted on each of said lower portions respectively, and extending upwardly and rearwardly between said first and second rollers; a third roller mounted on each of said lower portions respectively for rotation on an axis parallel to the axes of said first rollers and behind said second rollers, said third rollers having helical ridges thereon; fourth and fifth rollers, said fourth and fifth rollers being mounted on said upper portions respectively for rotation on axes parallel to the axes of said first rollers, said fourth rollers being disposed adjacent said second rollers, and said fifth rollers being mounted above and in front of said fourth rollers; belt means connecting said fourth rollers to said fifth rollers; transverse conveyor means mounted on said lower portions respectively, and disposed behind and below said second rollers, and adapted to carry objects outwardly; drive means operatively associated with said first, second, and third rollers and with said pulleys adapted to move the upper portions thereto to the rear of said helical ridges being helically inclined to induce outward movement of objects bearing against the same; and drive means operatively associated with said fourth and fifth rollers adapted to move the lower portions thereof to the rear.

3. A cucumber-harvester, comprising: first frame means; supporting means mounted on said first frame means, said supporting means bearing against the ground and establishing a path movement of said harvester; separate second frame means mounted at each of the opposite sides of said first frame means and extending inwardly from said sides, with the inner ends of said second frame means being laterally spaced apart, said second frame means being mounted with at least the ends thereof adjacent said central portion vertically adjustable, said second and third frame means each including an upper portion and a lower portion spaced therefrom in superimposed relationship; a ground-engaging shoe mounted on each of said lower portions spaced from each other; a first roller rotatably mounted on each of said lower portions and extending outwardly and upwardly from said shoes, respectively; a first pulley mounted on each of said lower portions for rotation on axes laterally disposed with respect to said path of movement and adjacent said shoes and behind said first rollers with respect to said path of movement; a second pulley rotatably mounted on each of said lower portions above and behind said first pulleys on axes respectively parallel to the axes thereof, belt means connecting said first pulleys to said second pulleys; a second roller rotatably mounted opposite said first roller on each of said lower portions respectively for rotation on axes parallel to the axes of rotation of said pulleys respectively; fourth and fifth rollers, said fourth and fifth rollers being mounted on said upper portions respectively for rotation on axes substantially parallel to the axes of said pulleys, said fourth rollers being disposed adjacent said second rollers, and said fifth rollers being mounted above and in front of said fourth rollers; belt means connecting said fourth rollers to said fifth rollers; transverse conveyor means mounted on said lower portions respectively, and disposed behind and below said second rollers, and adapted to carry objects outwardly; drive means operatively associated with said first and second rollers and with said pulleys adapted to move the upper portions thereof to the rear; and drive means operatively associated with said fourth and fifth rollers adapted to move the lower portions thereof to the rear.

4. A cucumber-harvester, comprising: a first frame means; supporting means mounted on said first frame means, said supporting means bearing against the ground and establishing a path of movement of said harvester; second frame means mounted on said first frame means, said second frame means being mounted with at least an end thereof vertically adjustable, said second frame means including an upper portion and a lower portion spaced therefrom in superimposed relationship; a ground-engaging shoe mounted on said end; a first roller rotatably mounted on said lower portion and extending laterally and upwardly from said shoe, respectively; a first pulley mounted on said lower portions for rotation on an axis laterally disposed with respect to said path of movement, and adjacent said shoe and behind said first roller with respect to said path of movement; a second pulley rotatably mounted on said lower portion above and behind said first pulley on an axis parallel to the axis thereof; belt means connecting said first pulley to said second pulley; a second roller rotatably mounted opposite said first roller on said lower portion for rotation on an axis substantially parallel to the axes of rotation of said pulleys; fourth and fifth rollers, said fourth and fifth rollers being mounted on said upper portion for rotation on axes substantially parallel to the axes of said pulleys, said fourth roller being disposed adjacent said second roller, and said fifth roller being mounted above and in front of said fourth roller; belt means connecting said fourth roller to said fifth roller; transverse conveyor means mounted on said lower portion, and disposed behind and below said second roller, and adapted to carry objects laterally; drive means operatively associated with said first and second rollers and with said pulleys adapted to move the upper portions thereof to the rear; and drive means operatively associated with said fourth and fifth rollers adapted to move the lower portions thereof to the rear.

5. A cucumber-harvester, comprising: first frame means; supporting means mounted on said first frame means, said supporting means bearing against the ground and establishing a path of movement of said harvester; second frame means mounted on said first frame means, said second frame means including an upper portion and a lower portion spaced therefrom in superimposed relationship; a vine-engaging shoe mounted on said lower portion; a first roller rotatably mounted on an axis laterally disposed with respect to said path of movement on said lower portion and extending from a point adjacent said shoe, said roller having a helical ridge thereon; a first pulley mounted on said lower portion for rotation on an axis substantially parallel to the axis of rotation of said roller, and adjacent said shoe; a second pulley rotatably mounted on said lower portion above and behind said first pulley on an axis parallel to the axis thereof; belt means connecting said first pulley to said second pulley; a second roller rotatably mounted opposite said first roller on said lower portion for rotation on an axis substantially parallel to the axis of rotation of said first roller; fourth and fifth rollers, said fourth and fifth rollers being mounted on said upper portion for rotation on axes substantially parallel to the axis of said first roller, said fourth roller being disposed adjacent said second roller, and said fifth roller being mounted above and in front of said fourth roller; belt means connecting said fourth roller to said fifth roller; transverse conveyor means mounted on said lower portion, and disposed behind and below said second roller, and adapted to carry objects outwardly; drive means operatively associated with said first and second rollers and with said pulleys adapted to move the upper portions thereof to the rear, said ridges being helically inclined to induce outward movement of objects bearing against the same; and drive means operatively associated with said fourth and fifth rollers adapted to move the lower portions thereof to the rear.

6. A cucumber-harvester, comprising: first frame means; supporting means mounted on said first frame means, said supporting means bearing against the ground and establishing a path of movement of said harvester; second frame means mounted on said first frame means, said second frame means including an upper portion and a lower portion spaced therefrom in superimposed relationship; a vine-engaging shoe mounted on said lower portion; a first roller rotatably mounted on an axis laterally disposed with respect to said path of movement on said lower portion and extending from a point adjacent said shoe; a first pulley mounted on said lower portion for rotation on a laterally disposed axis with respect to said path of movement, and adjacent said shoe; a second pulley rotatably mounted on said lower portion above and behind said first pulley on an axis parallel to the axis thereof; belt means connecting said first pulley to said second pulley; a second roller rotatably mounted opposite said first roller on said lower portion for rotation on an axis substantially parallel to the axis of rotation of said pulleys; fourth and fifth rollers, said fourth and fifth rollers being mounted on said upper portion for rotation on axes substantially parallel to the axes of said pulleys, said fourth roller being disposed adjacent said second roller, and said fifth roller being mounted above and in front of said third roller; belt means connecting said fourth roller to said fifth roller; transverse conveyor means mounted on said lower portion, and disposed behind and below said second roller, and adapted to carry objects outwardly; drive means operatively associated with said first and second rollers and with said pulleys adapted to move the upper portions thereof to the rear; and drive means operatively associated with said fourth and fifth rollers adapted to move the lower portions thereof to the rear.

7. A cucumber-harvester, comprising: first frame means; supporting means mounted on said first frame means, said supporting means bearing against the ground and establishing a path of movement of said harvester; second frame means mounted on said first frame means, said second frame means including an upper portion and a lower portion spaced therefrom in superimposed relationship; a vine-engaging shoe mounted on said lower portion; a first pulley mounted on said lower portion for rotation on an axis laterally disposed with respect to said path of movement, and adjacent said shoe; a second pulley rotatably mounted on said lower portion above and behind said first pulley on an axis parallel to the axis thereof; belt means connecting said first pulley to said second pulley; a second roller rotatably mounted on said lower portion for rotation on an axis substantially parallel to the axis of rotation of said pulleys; a second roller rotatably mounted opposite said first roller on said lower portion for rotation on an axis substantially parallel to the axis of rotation of said pulleys; fourth and fifth rollers, said fourth and fifth rollers being mounted on said upper portion for rotation on axes substantially parallel to the axes of said pulleys, said fourth roller being disposed adjacent said second roller, and said fifth roller being mounted above and in front of said fourth roller; belt means connecting said fourth roller to said fifth roller; transverse conveyor means mounted on said lower portion, and disposed behind and below said second roller, and adapted to carry objects laterally; drive means operatively associated with said first roller and with said pulleys adapted to move the upper portions thereof to the rear; and drive means operatively associated with said fourth and fifth rollers adapted to move the lower portions thereof to the rear.

References Cited in the file of this patent

UNITED STATES PATENTS

| | | |
|---|---|---|
| 1,259,465 | Sanford | Mar. 12, 1918 |
| 1,371,437 | Pringle | Mar. 15, 1921 |
| 1,537,824 | Hibbs | May 24, 1925 |
| 1,623,849 | Orrick | Apr. 5, 1927 |
| 2,466,089 | Esch | Apr. 5, 1949 |
| 2,589,644 | Thostenson | Mar. 18, 1952 |
| 2,675,663 | Ward | Apr. 20, 1954 |